United States Patent [19]

Stadlmeier et al.

[11] Patent Number: 5,208,915

[45] Date of Patent: May 4, 1993

[54] APPARATUS FOR THE MICROPROGRAM CONTROL OF INFORMATION TRANSFER AND A METHOD FOR OPERATING THE SAME

[75] Inventors: Hans Stadlmeier; Franz Schönberger, both of Munich, Fed. Rep. of Germany

[73] Assignee: Siemens Aktiengesellschaft, Munich, Fed. Rep. of Germany

[21] Appl. No.: 742,172

[22] Filed: Aug. 1, 1991

Related U.S. Application Data

[63] Continuation of Ser. No. 205,505, Jun. 3, 1988, abandoned, which is a continuation of Ser. No. 549,582, Nov. 7, 1983, abandoned.

[30] Foreign Application Priority Data

Nov. 9, 1982 [DE] Fed. Rep. of Germany ....... 3241356

[51] Int. Cl.$^5$ .......................... G06F 9/06; G06F 9/22
[52] U.S. Cl. ................................. 395/325; 395/375; 364/231.8; 364/238.4; 364/241.9; 364/247.6; 364/DIG. 1; 364/933.5; 364/948.34; 364/968
[58] Field of Search ................ 364/200, 900; 395/325, 395/375

[56] References Cited

U.S. PATENT DOCUMENTS

| | | | |
|---|---|---|---|
| 4,075,691 | 2/1978 | Davis et al. ................ | 395/275 |
| 4,271,466 | 6/1981 | Yamamoto et al. ........ | 395/425 |
| 4,276,594 | 6/1981 | Morley ........................ | 395/800 |
| 4,313,160 | 1/1982 | Kaufman et al. ........... | 395/275 |
| 4,344,130 | 8/1982 | Fung et al. .................. | 395/425 |
| 4,453,211 | 6/1984 | Askinazi et al. ............ | 395/500 |
| 4,475,155 | 10/1984 | Oishi et al. ................ | 395/275 |
| 4,484,271 | 11/1984 | Miu et al. .................. | 395/375 |
| 4,514,808 | 4/1985 | Murayama et al. ......... | 395/425 |

FOREIGN PATENT DOCUMENTS 57-105019 6/1982 Japan .

Primary Examiner—Thomas C. Lee
Assistant Examiner—Paul Harrity
Attorney, Agent, or Firm—Herbert L. Lerner; Laurence A. Greenberg

[57] ABSTRACT

A direct memory access (DMA) controller configured such that it attains a highest possible data transfer rate and short reaction time at a low microprogram length, and short read times on transfer demands. This is attained by providing, in addition to a microprogram interim memory, a data handling unit, wherein the microprogram interim memory receives the microinstruction for the presently working channel from a microprogram memory via one of the channel-specific instruction registers, for which there is provided one instruction register for each channel. The data handling unit, after being initialized by the microprogram, independently controls the channel-specific processing of the transfer of DMA information.

10 Claims, 10 Drawing Sheets

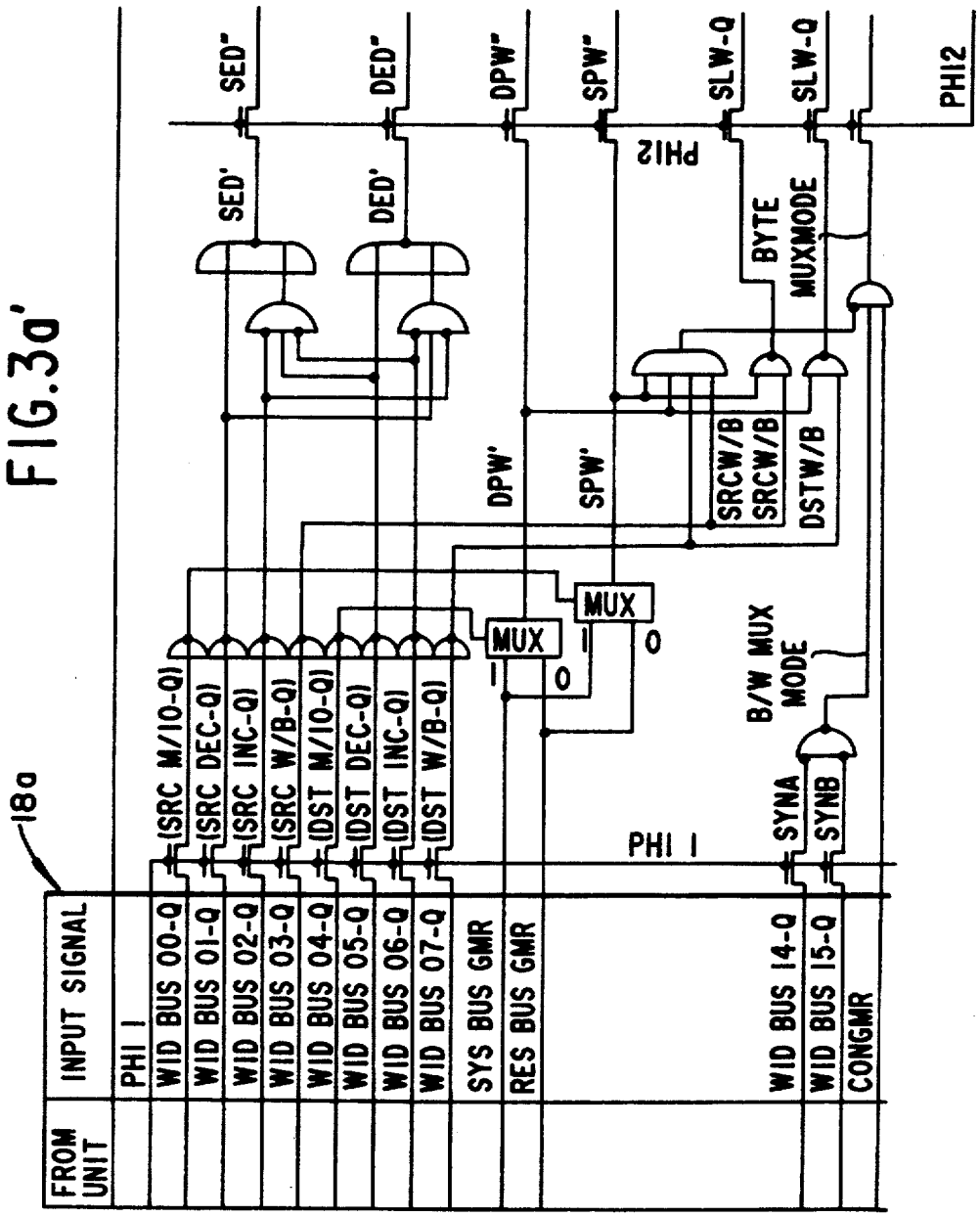

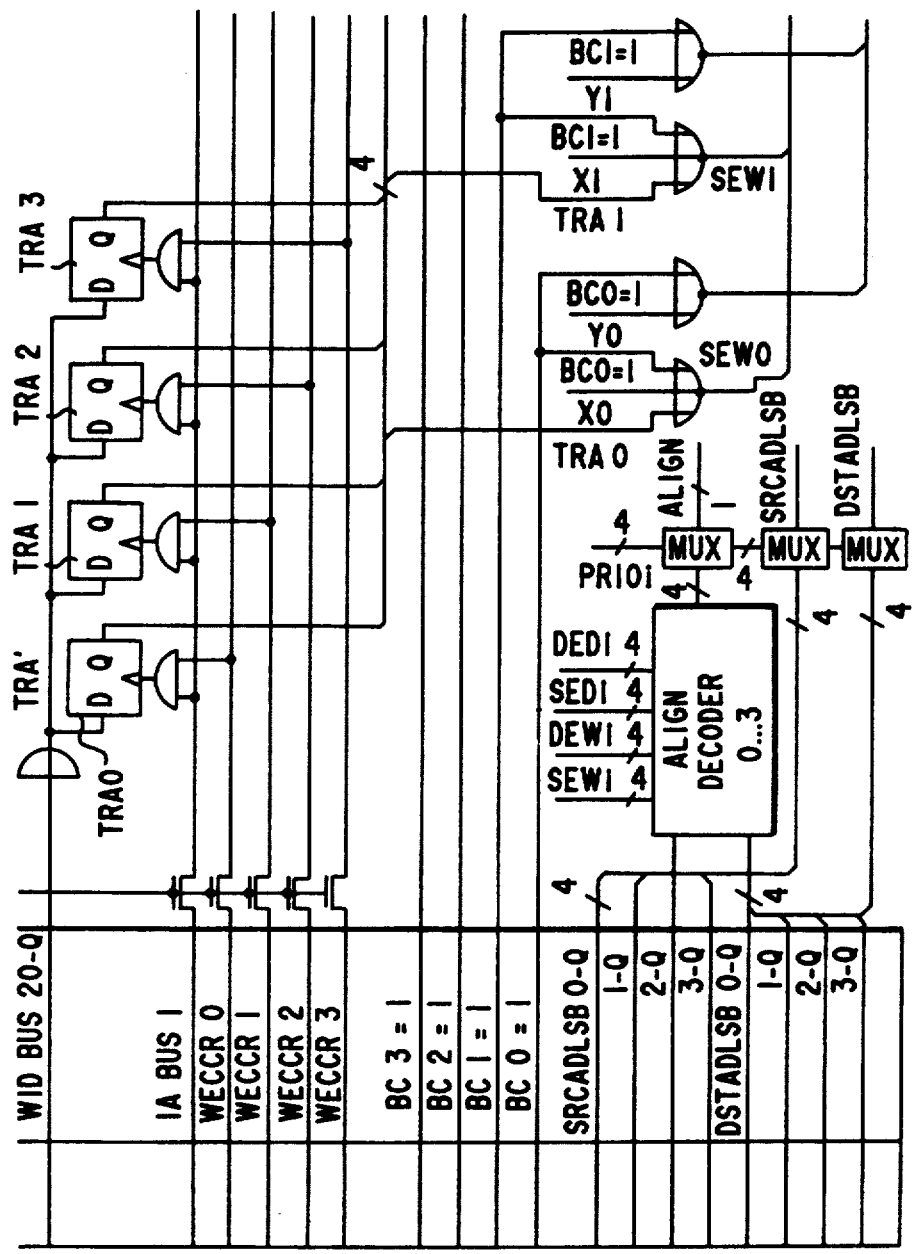
FIG.3a"

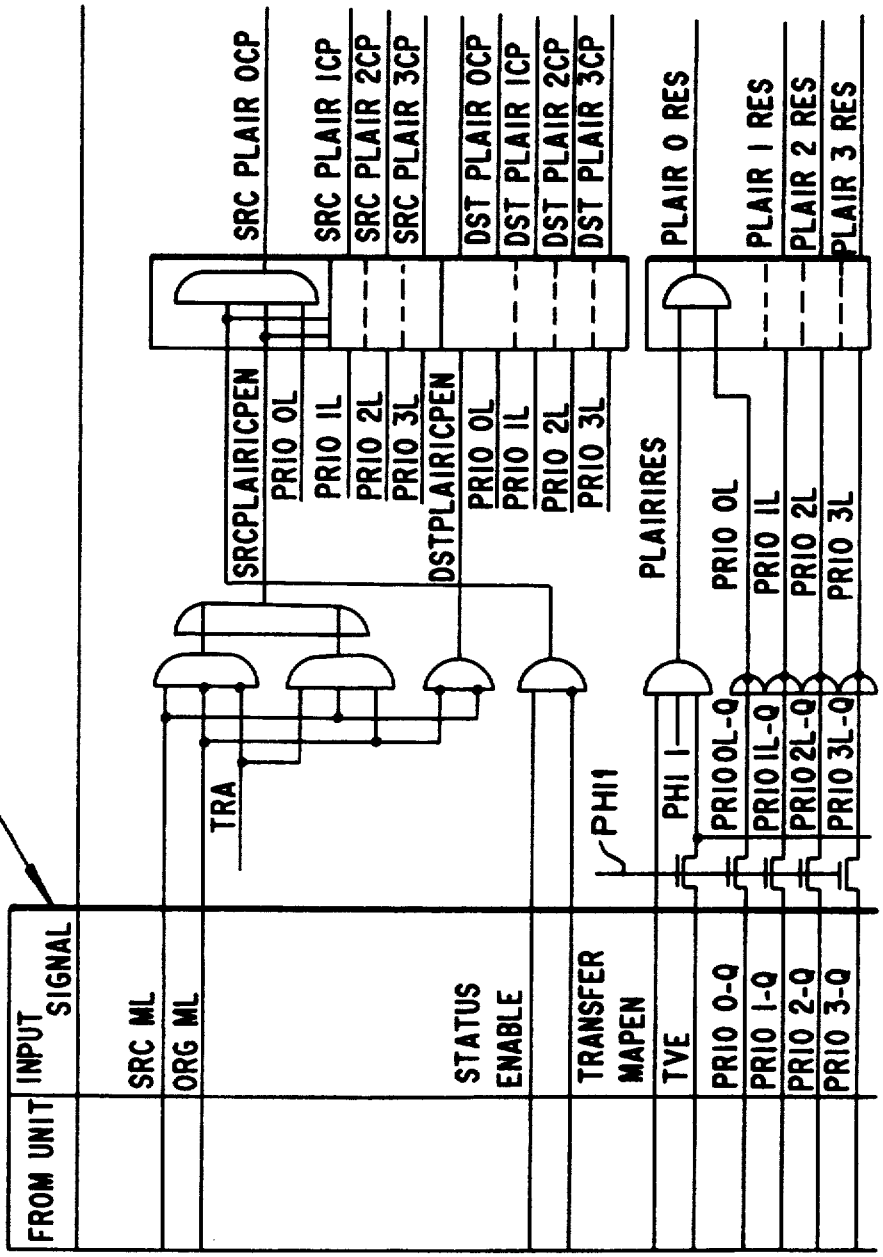

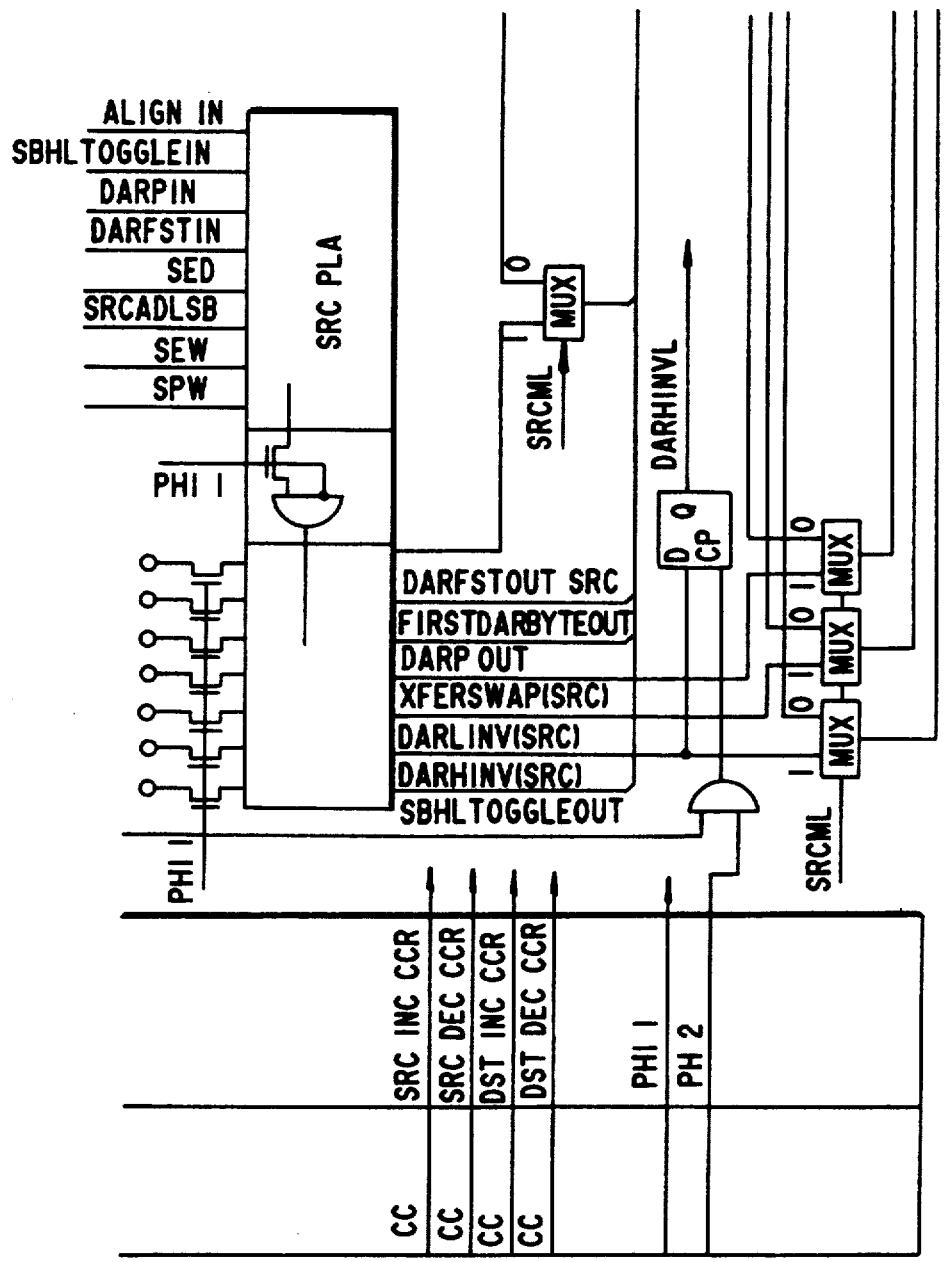
FIG.4a"

FIG.5

SRC PLA — 66

| # | SPW | SEW | SRCADLSB | SED | DARFSTIN | DARP IN | SBHLTOGGLE IN | ALIGN | | WORDPLASRC | DARHINV | DARLINV | XFERSWAP | DARFSTOUT | DARP OUT | FIRSTDARBYTE | SBHLTOGGLE OUT |
|---|---|---|---|---|---|---|---|---|---|---|---|---|---|---|---|---|---|
| 1 | 0 | 0 | X | 1 | 0 | 0 | 0 | 0 | | 0 | 0 | 1 | 0 | 1 | 0 | 0 | 1 |
|   | 1 | 0 | 0 | 1 | 0 | 0 | 0 | 0 | | 0 | 0 | 1 | 0 | 1 | 0 | 0 | 1 |
| 2 | 0 | 0 | X | 1 | 1 | 0 | 1 | 0 | | 0 | 1 | 0 | 1 | 0 | 0 | 0 | 0 |
|   | 1 | 0 | 0 | 1 | 1 | 0 | 1 | 0 | | 0 | 1 | 0 | 1 | 0 | 0 | 0 | 0 |
| 3 | 0 | 0 | X | 0 | 0 | 0 | 0 | 0 | | 0 | 1 | 0 | 1 | 1 | 0 | 1 | 1 |
|   | 1 | 0 | 0 | 0 | 0 | 0 | 0 | 0 | | 0 | 1 | 0 | 1 | 1 | 0 | 1 | 1 |
| 4 | 0 | 0 | X | 0 | 1 | 0 | 1 | 0 | | 0 | 0 | 1 | 0 | 0 | 0 | 1 | 0 |
|   | 1 | 0 | 0 | 0 | 1 | 0 | 1 | 0 | | 0 | 0 | 0 | 1 | 0 | 0 | 0 | 1 |
| 5 | 0 | 0 | X | 1 | 0 | 0 | 1 | 0 | | 0 | 1 | 0 | 1 | 1 | 0 | 1 | 0 |
|   | 1 | 0 | 0 | 1 | 0 | 0 | 1 | 0 | | 0 | 1 | 0 | 1 | 1 | 0 | 1 | 0 |
| 6 | 0 | 0 | X | 0 | 0 | 0 | 1 | 0 | | 0 | 0 | 1 | 0 | 1 | 0 | 0 | 0 |
|   | 1 | 0 | 0 | 0 | 0 | 0 | 1 | 0 | | 0 | 0 | 1 | 0 | 1 | 0 | 0 | 0 |
| 7 | 0 | 0 | X | X | 0 | 0 | 0 | 1 | | 0 | 0 | 1 | 0 | 1 | 1 | 0 | 1 |
|   | 1 | 0 | 0 | X | 0 | 0 | 0 | 1 | | 0 | 0 | 1 | 0 | 0 | 1 | 0 | 1 |
| 8 | 0 | 0 | X | X | 0 | 1 | 1 | 0 | | 0 | 1 | 0 | 1 | 1 | 1 | 1 | 0 |
|   | 1 | 0 | 0 | X | 0 | 1 | 1 | 0 | | 0 | 1 | 0 | 1 | 1 | 1 | 1 | 0 |
| 9 | 0 | 0 | X | X | 1 | 1 | 0 | 0 | | 0 | 0 | 1 | 0 | 0 | 1 | 1 | 1 |
|   | 1 | 0 | 0 | X | 1 | 1 | 0 | 0 | | 0 | 0 | 1 | 0 | 0 | 1 | 1 | 1 |
| 10 | 1 | 0 | 1 | 1 | 1 | 0 | 1 | 0 | | 0 | 1 | 0 | 0 | 0 | 0 | 0 | 0 |
| 11 | 1 | 0 | 1 | 1 | 0 | 0 | 0 | 0 | | 0 | 0 | 1 | 1 | 1 | 0 | 0 | 1 |
| 12 | 1 | 0 | 1 | 0 | 1 | 0 | 1 | 0 | | 0 | 0 | 1 | 1 | 0 | 0 | 1 | 0 |
| 13 | 1 | 0 | 1 | 0 | 0 | 0 | 0 | 0 | | 0 | 1 | 0 | 0 | 1 | 0 | 1 | 1 |
| 14 | 1 | 0 | 1 | 1 | 0 | 0 | 1 | 0 | | 0 | 1 | 0 | 0 | 1 | 0 | 1 | 0 |
| 15 | 1 | 0 | 1 | 0 | 0 | 0 | 1 | 0 | | 0 | 0 | 1 | 1 | 1 | 0 | 0 | 0 |
| 16 | 1 | 0 | 1 | X | 0 | 1 | 1 | 0 | | 0 | 1 | 0 | 0 | 1 | 1 | 1 | 0 |
| 17 | 1 | 0 | 1 | X | 0 | 0 | 0 | 1 | | 0 | 0 | 1 | 1 | 1 | 1 | 0 | 1 |
|   | 1 | 1 | X | X | X | 0 | 0 | 1 | | 0 | 0 | 1 | 1 | 1 | 1 | 0 | 1 |
| 18 | 1 | 0 | 1 | X | 1 | 1 | 0 | 0 | | 0 | 0 | 1 | 1 | 0 | 1 | 1 | 0 |
| 19 | 1 | 1 | 0 | X | X | 0 | 0 | 0 | | 1 | 1 | 1 | 0 | 0 | 0 | 0 | 0 |
| 20 | 1 | 1 | 1 | X | X | 0 | 0 | 0 | | 1 | 1 | 1 | 1 | 0 | 0 | 0 | 0 |
| 21 | 1 | 1 | X | X | X | 1 | 1 | 0 | | 1 | 1 | 1 | 1 | 0 | 1 | 1 | 1 |

FIG.6

DESTINATION PLA ~67

| # | DBHLTOGGLE IN | DARP IN | DARFST IN | FIRSTDARBYTE | DPW | DEW | DED | DSTAPLSB | SEW | WORDPLADST | DARHINV | DARLINV | XFERSWAP | DBHLTOGGLE OUT | DARFSTOUT |
|---|---|---|---|---|---|---|---|---|---|---|---|---|---|---|---|
| 1 | 0 | 0 | 0 | 0 | 0 | 0 | 1 | X |   | 0 | 0 | 1 | 0 | 1 | 1 |
|   | 0 | 0 | 0 | 0 | 1 | 0 | 1 | 0 |   | 0 | 0 | 1 | 0 | 1 | 1 |
| 2 | 1 | 0 | 1 | 0 | 0 | 0 | 1 | X | 1 | 0 | 1 | 0 | 1 | 0 | 0 |
|   | 1 | X | 1 | 1 | 0 | 0 | X | X |   | 0 | 1 | 0 | 1 | 0 | 0 |
|   | 1 | 0 | 1 | 0 | 1 | 0 | 1 | 0 | 1 | 0 | 1 | 0 | 1 | 0 | 0 |
|   | 1 | X | 1 | 1 | 1 | 0 | X | 0 |   | 0 | 1 | 0 | 1 | 0 | 0 |
| 3 | 0 | 0 | 0 | 0 | 0 | 0 | 0 | X |   | 0 | 1 | 0 | 1 | 1 | 1 |
|   | 0 | 0 | 0 | 0 | 1 | 0 | 0 | 0 |   | 0 | 1 | 0 | 1 | 1 | 1 |
| 4 | 1 | 0 | 1 | 0 | 0 | 0 | 0 | X | 1 | 0 | 0 | 1 | 0 | 0 | 0 |
|   | 1 | 0 | 1 | 0 | 0 | 0 | X | X | 0 | 0 | 0 | 1 | 0 | 0 | 0 |
|   | 1 | 0 | 1 | 0 | 1 | 0 | 0 | 0 | 1 | 0 | 0 | 1 | 0 | 0 | 0 |
|   | 1 | 0 | 1 | 0 | 1 | 0 | X | 0 | 0 | 0 | 0 | 1 | 0 | 0 | 0 |
| 5 | 0 | 1 | 1 | X | 0 | 0 | X | X |   | 0 | 0 | 1 | 0 | 1 | 0 |
|   | 0 | 0 | 1 | 0 | 0 | 0 | X | X |   | 0 | 0 | 1 | 0 | 1 | 0 |
|   | 0 | 1 | 1 | X | 1 | 0 | X | 0 |   | 0 | 0 | 1 | 0 | 1 | 0 |
|   | 0 | 0 | 1 | 0 | 1 | 0 | X | 0 |   | 0 | 0 | 1 | 0 | 1 | 0 |
| 6 | 1 | 1 | 0 | 1 | 0 | 0 | X | X |   | 0 | 1 | 0 | 1 | 0 | 1 |
|   | 1 | 1 | 0 | 1 | 1 | 0 | X | 0 |   | 0 | 1 | 0 | 1 | 0 | 1 |
| 7 | 0 | 0 | 1 | 1 | 0 | 0 | X | X |   | 0 | 1 | 0 | 1 | 1 | 0 |
|   | 0 | 0 | 1 | 1 | 1 | 0 | X | 0 |   | 0 | 1 | 0 | 1 | 1 | 0 |
| 8 | 1 | 0 | 1 | 0 | 1 | 0 | 1 | 1 | 1 | 0 | 1 | 0 | 0 | 0 | 0 |
|   | 1 | X | 1 | 1 | 1 | 0 | X | 1 |   | 0 | 1 | 0 | 0 | 0 | 0 |
| 9 | 0 | 1 | 1 | X | 1 | 0 | X | 1 |   | 0 | 0 | 1 | 1 | 1 | 0 |
|   | 0 | X | 1 | 0 | 1 | 0 | X | 1 |   | 0 | 0 | 1 | 1 | 1 | 0 |
|   | 0 | 1 | 1 | X | 1 | 1 | X | X |   | 0 | 0 | 1 | 1 | 1 | 0 |
| 10 | 1 | 0 | 1 | 0 | 1 | 0 | 0 | 1 | 1 | 0 | 0 | 1 | 1 | 0 | 0 |
|   | 1 | 0 | 1 | 0 | 1 | 0 | X | 1 | 0 | 0 | 0 | 1 | 1 | 0 | 0 |
| 11 | 0 | 0 | 1 | 1 | 1 | 0 | X | 1 |   | 0 | 1 | 0 | 0 | 1 | 0 |
| 12 | 0 | 0 | 0 | 0 | 1 | 0 | 1 | 1 |   | 0 | 0 | 1 | 1 | 1 | 1 |
| 13 | 0 | 0 | 0 | 0 | 1 | 0 | 0 | 1 |   | 0 | 1 | 0 | 0 | 1 | 1 |
| 14 | 1 | 1 | 0 | 1 | 1 | 0 | X | 1 |   | 0 | 1 | 0 | 0 | 0 | 1 |
| 15 | 0 | 0 | 0 | X | 1 | 1 | X | 0 |   | 1 | 1 | 1 | 0 | 0 | 0 |
| 16 | 0 | 0 | 0 | X | 1 | 1 | X | 1 |   | 1 | 1 | 1 | 1 | 0 | 0 |
| 17 | 1 | 1 | 0 | 1 | 1 | 1 | X | X |   | 1 | 1 | 1 | 1 | 1 | 0 |

APPARATUS FOR THE MICROPROGRAM CONTROL OF INFORMATION TRANSFER AND A METHOD FOR OPERATING THE SAME

This application is a continuation of application Ser. No. 205,505, filed Jun. 3, 1988, now abandoned. which is a continuation of application Ser. No. 549,582, filed Nov. 7, 1983, now abandoned.

BACKGROUND OF THE INVENTION

Field of the Invention

The invention relates to an apparatus for the microprogram control of information transfer, and to a method for operating the same.

An integrated high-performance DMA control ADMA (advanced direct memory access), may have four mutually independent channels which accomplish the data transfer between media (memories, peripheral equipment) or, more generally, between data sources and data sinks. The main control of the channels is taken over by microprograms which are stored within the electronic module in a microcommand memory ROM.

The microprograms are divided into two main groups: Organization programs which read the necessary control information from the command blocks deposited in the organization memory upon starting the channel or in concatenating or linking commands or data and redepositing control information, such as status information, in the organization memory after a data transfer, and also perform internal administration, so that the organization programs (ORG programs) control the control transfer; and DMA programs which carry out the data transfer proper. The organization programs are formed of ORG microcommands. The control transfer controlled by ORG microcommands is comparatively simple and is controlled exclusively by ORG microcommands themselves. This takes about 80 microcommands. Contrary to the control transfer by ORG programs, DMA transfer is substantially more complex due to the large number of parameters to be taken into consideration, such as physical and logical bus widths of the data source and the data sink, direction of counting, manner of counting of the pointer addresses, even or odd pointer addresses, address straightening (ALIGN) for reducing the bus transfers, and so on. If all of these DMA cases were controlled purely by microprogram-type control transfer, several hundred microcommands would be required for all of the DMA cases. This takes space in the microcommand memory ROM and accordingly reading time as well.

It is accordingly an object of the invention to provide an apparatus for the microprogram control of information transfer and a method for operating the same, which overcomes the hereinaforementioned disadvantages of the heretofore-known apparatus and methods of this general type, which requires little space in the microcommand memory ROM and short reading times, and which permits a high transfer rate and a short reaction time to transfer requests.

SUMMARY OF THE INVENTION

With the foregoing and other objects in view there is provided, in accordance with the invention, main control apparatus for the microprogram control of information transfer, comprising a device for mainly controlling transfer with microcommands, and another device connected to the main control apparatus for partially controlling information transfer with hardware.

In accordance with another feature of the invention, the other device includes interim storage, apparatus for interim storage of information bytes to be transferred.

In accordance with a further feature of the invention, the other device includes a device for stationary storage of statements regarding the information to be transferred.

In accordance with an added feature of the invention, the other device includes a device for the dynamic storage of statements regarding the other device for the interim storage of information bytes to be transferred.

In accordance with an additional feature of the invention, the other device includes a device for the offset formation of an address modification of data source addresses or data sink addresses and for the control of a swapper.

In accordance with again another feature of the invention, the other device includes a device for indicating the quantity of information to be transferred.

In accordance with again a further feature of the invention, the other device includes data assembly registers and a device for indicating the involved bytes of a set of the data assembly registers.

In accordance with again an added feature of the invention, the other device includes data assembly registers and a device for indicating a filling level in the data assembly registers.

In accordance with again an additional feature of the invention, the other device includes a device for flagging the presence of an address-straightening case.

In accordance with yet another feature of the invention, the other device includes a device for indicating the location of the first transferred byte in a word quantity.

In accordance with yet a further feature of the invention, the other device includes a device for signaling the recognition of an address-straightening case.

In accordance with yet an added feature of the invention, the other device includes a data register assembly and a device for input and output control of data a assembly register.

In accordance with yet an additional feature of the invention, the other device includes a device for indicating physical bus widths.

In accordance with still another feature of the invention, the other device includes a device for indicating effective access quantities on a transfer bus.

In accordance with still a further feature of the invention, the other device includes a device for indicating an effective direction of working-up strings.

In accordance with still and added feature of the invention, the other device includes a device for selecting a relevant transfer bus half in bus configurations of 16 bits.

In accordance with still an additional feature of the invention, the other device includes a device for the byte-wise mirroring of an internal data bus on an external data bus.

In accordance with another feature of the invention, there are provided a device connected to the other device for data address modification.

In accordance with a further feature of the invention, there are provided address pointer registers connected to the other device.

Further in accordance with the objects of the invention, there is provided a method for operating an apparatus for the microprogram control of information transfer, including a device for mainly controlling information transfer with microcommands, and another device connected to the main control means for partially controlling information transfer with hardware including data assembly registers, which comprises storing control information for an interim period with the data assembly registers.

In accordance with an added mode of the invention, there is provided a method for operating an apparatus for the microprogram control of information transfer, including a device for mainly controlling information transfer with microcommands, and another device connected to the main control means for partially controlling information transfer with hardware including data assembly registers, which comprises representing the basis for a match control and for a verify control with the data assembly registers.

In accordance with an additional mode of the invention, there is provided a method wherein the other device is in the form of a data handling unit, which comprises determining the access quantity byte/word in an information transfer to an external bus with the data handling unit.

In accordance with again another mode of the invention, there is provided a method wherein the other devices is in the form of a data handling unit including a data assembly register with halves, which comprises activating the halves of the data assembly register with respect to transfer operations, with the data handling unit.

In accordance with again a further mode of the invention, there is provided a method including a bus interface unit with a swapper connected to the other device being in the form of a data handling unit, which comprises controlling internal data buses inclusive of the swapper in the bus interface unit with the data handling unit.

In accordance with again an added mode of the invention, there is provided a method wherein the other device is a data handling unit, which comprises controlling the actions necessary for compare, mismatch and verify operations with the data handling unit.

In accordance with again an additional mode of the invention, there is provided a method wherein the other device is in the form of a data handling unit including data assembly registers, which comprises administering control parameters of the data assembly registers with the data handling unit.

In accordance with a concomitant mode of the invention, there is provided a method wherein the other device is a data handling unit, which comprises furnishing an offset value which is added to each address pointer after each DMA access, with the data handling unit.

Other features which are considered as characteristic for the invention are set forth in the appended claims.

Although the invention is illustrated and described herein as embodied in an apparatus for the microprogram control of information transfer and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the ac companying drawings.

BRIEF DESCRIPTION OF THE DRAWING

FIGS. 5 and 6 are truth tables belonging to the data processing unit according to FIGS. 3 and 4.

DESCRIPTION OF THE PREFERRED EMBODIMENTS

Figure 1:
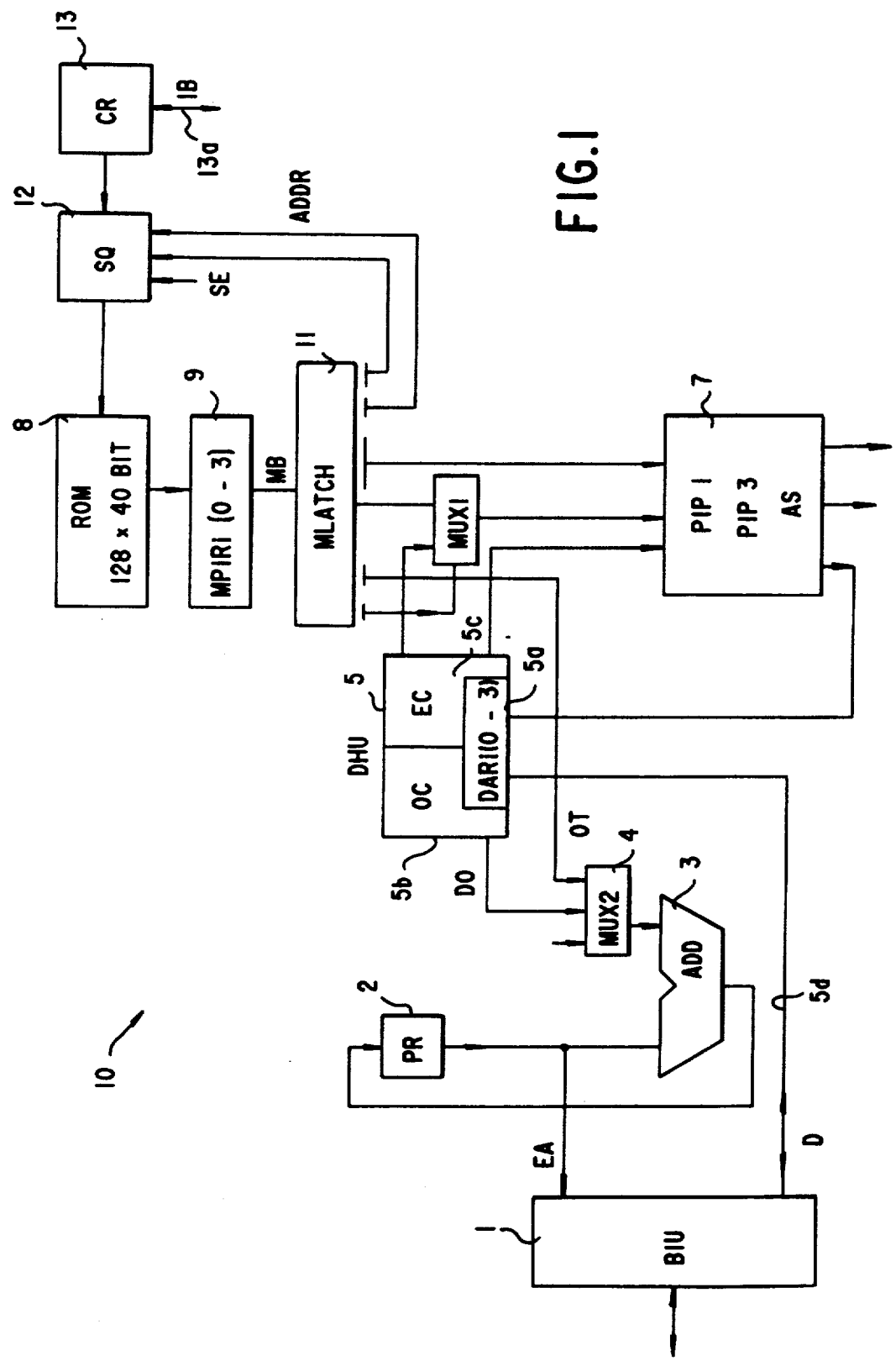
FIG. 1 is a block circuit diagram of an embodiment of the invention.
Figure 2:
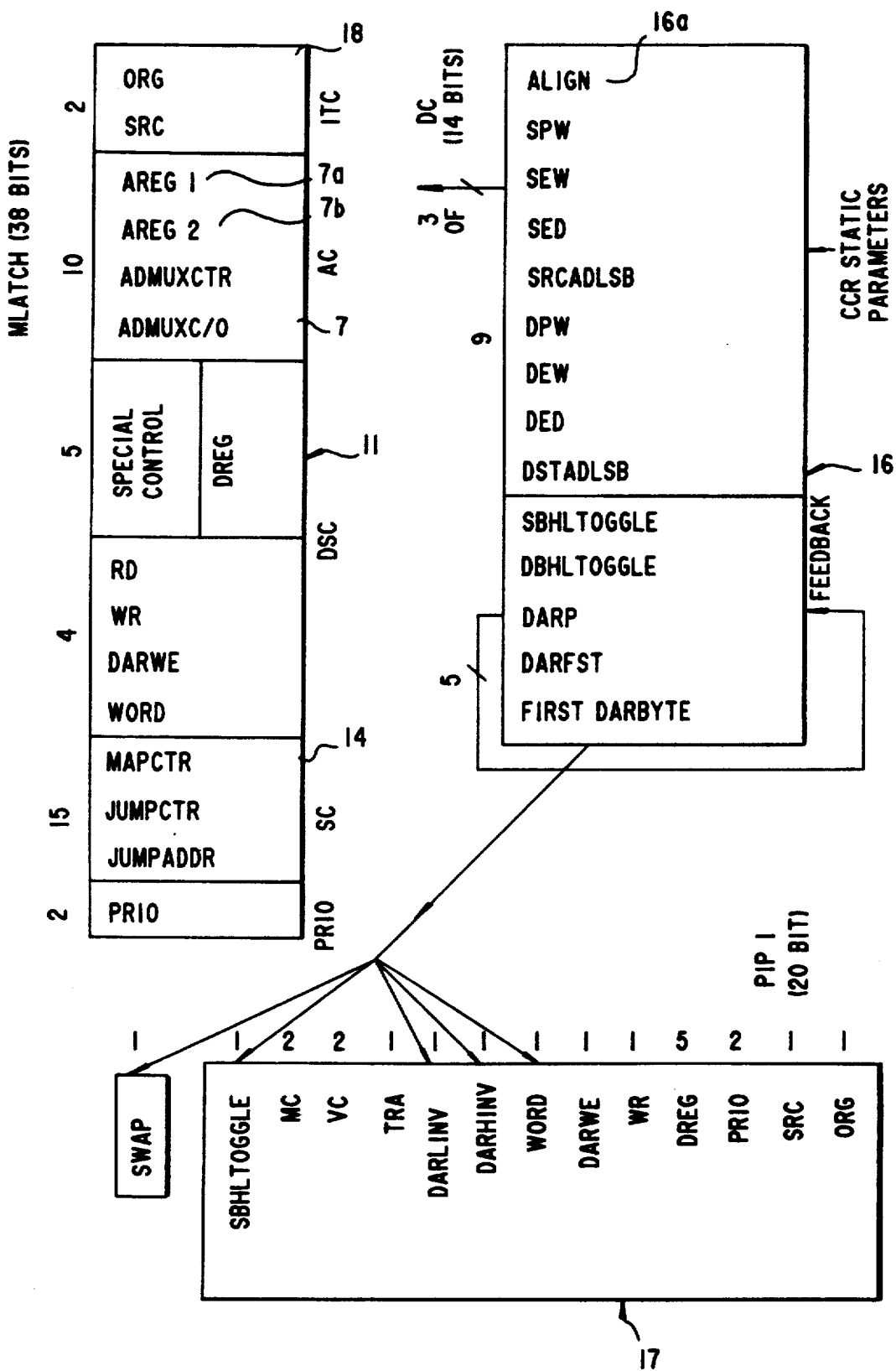
FIG. 2 is another block diagram illustrating the main control by microcommands and means for partial control, as far as hardware is concerned.

Referring now to the figures of the drawing in detail and first particularly to FIG. 1 and 2 thereof, there is seen a block circuit diagram of an embodiment of the invention. An integrated, microprogrammed, high-performance DMA control ADMA 10 shown in the drawing may have four mutually independent channels which allow autonomous data transfer between sources (SRC) and sinks (DST). The SRC and DST may take the form of memories and peripheral equipment in any suitable configuration, with widths of 8 or 16 bits in any combination. The instructions given to the module ADMA 10, such as the address of data sources (SRC address), the address of the data sink (DST address), the number of bytes to be transferred (byte count) and the DMA transfer mode, are independently transferred from a communications memory region (organization memory) in a "memory control block" (command block) after a channel start, through an internal bus IB 13a into internal address registers, counter registers and command registers PR 2, CR 13 of the ADMA 10. After this so-called "SETUP" of a selected channel, the DMA transfer proper begins.

Since four equivalent DMA channels are provided in the ADMA 10, and since these four channels can operate practically simultaneously by the pipeline method, it is possible to use priorities set in the transfer mode to interrupt the processing of a low-priority channel by requesting a channel with higher priority, without a loss of time. Since the ADMA 10 has only one unit for operating according to commands, the internal states regarding the microprogram progress and the data transfer progress in the ADMA 10 are stored and administered selectively for each channel.

An alignment detector ALIGN 16a, FIG. 2 serves for optimizing the DMA transfer rate and minimizing the bus load in the case of a DMA transfer. Upon being activated, the alignment detector ALIGN 16a ensures that instead of a word transfer quantity, only a single byte transfer is initially carried out, so that the further transfers can be continued word by word within the started DMA transfer block. The alignment detector ALIGN 16a therefore detects a possible address-straightening or reduction of the DMA transfer and in such a case initiates this type of address-straightening or reduction of the DMA transfer. The address-straightening occurs for certain configurations of SRC and DST bus types, for least-significant SRC and DST pointer address bits, and for positive data operation directions.

In order to achieve the same goal of optimizing the DMA transfer rate and for minimizing the bus loading, a so-called "assembly/disassembly function is provided which makes it possible to compensate different SRC and DST bus widths, as far as transmission is concerned. Thus, two bytes can be read sequentially, for instance, in the case of an 8-bit SRC bus, so that an entire word (=2 bytes) can then be finished on a 16-bit DST bus ("assembly"). Conversely, in the case of a word read access on a 16-bit SRC bus, this entire word read by the data source can be split into 2 bytes and can then be read out in 2 byte write accesses on an 8-bit DST bus ("disassembly").

SRC and DST data block transfers can be performed in the ADMA in any desired string direction (forward and backward). This is important in the backward-reading of tape equipment. The SRC and DST string directions may also be different in the ADMA10. With physical bus widths of 16 bits, the ADMA10 also supports the logical data type "byte", which makes it possible to accelerate the data transfer, besides the logical data type "word".

Other ADMA10 features "verify", "mismatch" and "byte compare" and "word compare" options, are performed independently of SRC and DST bus configurations, independently of address straightening or reductions, independently of logical data types byte/word, independently of data string processing directions of SRC and DST blocks, and independently of a "translate" option.

The integrated high-performance DMA controller ADMA10 has four mutually independent channels. The main control of the channels is taken over by microprograms. The sequence of the microcommands is controlled by a sequencer SQ12. It is the purpose of a given time-state parameter (T-state) with the phase PHI1, to select a microprogram instruction register MPIRi9 in the ADMA10 of the prioritized channel i, wherein i=0, 1, 2, 3, and to transfer the microcommand MB contained therein into a microcommand interim memory MLATCH11. For the duration of a microcommand, the microcommand interim memory MLATCH11 contains the current microword necessary for working-off or finishing a bus cycle or for working-off or finishing an internal organization address computation. A multiplicity of the hardware units of the ADMA10 receive their instructions directly from the microcommand interim memory MLATCH11. The sequencer SQ12 is controlled by control and test inputs ADDR and by signals from the internal register CR13. The sequencer SQ12 provides a microcommand sequence link which reads the respective following microcommand MB specifically for a selected channel, from the microcommand memory ROM8.

A 24-bit pointer address is read from the internal ADMA pointer register set PR2 and is transferred in the form of an operand, to an adder ADD3 as well as in the form of an external address EA, to an address buffer at a bus interface unit BIU1. Among other things, this 24-bit pointer address EA serves as an external address EA for an external read or write operation. The second operand for an address pointer addition in the adder ADD3 is delivered to inputs of a multiplexer MUX24 in dependence on the microcommand type. The second operand is delivered either from the microword in the interim memory MLATCH11 over a line OT in case of an ORG-"OFFSET" or by means of an autonomous "OFFSET" logic OC within a data handling or processing unit DHU5 over a line DO. The multiplexer MUX24 determines which input of the multiplexer MUX24 has its turn for entering the second operand into the adder ADD3.

The result of the addition performed in the adder ADD3 is rewritten into the 24-bit pointer register set PR2 under an address given in the microword, if the instantaneously processed microcommand is valid.

In the case of microcommands MB which relate to the external data transfer, a byte counter which is specific to a channel is additionally decremented, contrary to internal organization microcommands, for the case in which the status can be read out to the external bus for the beginning of an external read or write operation, and a data assembly register DARi5a of the autonomous data handling or processing unit DHU5, wherein i=0, 1, 2, 3, is acted upon by a clock pulse or read signal.

For reasons of optimum utilization of the microcommand stored in the internal microcommand memory ROM8, a data handling unit DHU5 has been provided which makes it possible to reach all of the organizational transfers for loading the ADMA registers CR13, PR2 from the memory, which advantageously is in the form of a command block, with only a single set of so-called "SETUP" microcommands. This is carried out independently of the bus width of the organization memory (for instance, 8 bits or 16 bits) which is connected to the ADMA and in which the channel program of the ADMA is stored, and independently of whether the "command pointer" address is even or odd.

The data handling unit DHU includes an "OFFSET" control OC5b and an execution control EC5c, besides the data assembly registers DARi5a. These controls OC5b, EC5c relate to information exchange with external information sources as well as with external information sinks. The microword stored in the interim memory MLATCH11 furnishes control signals SE for controlling the sequencer SQ12, for controlling means PIP7 for the pipelining of data, for controlling the byte counter, for furnishing information for the address pointer control, for furnishing information for the sequencer control and for furnishing information for controlling the external write access.

With an apparatus according to FIG. 1, every pointer address can be incremented, decremented or kept constant. With an apparatus according to FIG. 1, any desired physical bus width and logical bus width can be combined with each other.

The extent to which the execution control EC5c of the data handling unit DHU5 can influence the execution control AS7 of the ADMA through a multiplexer MUX16, is controlled by the microword contained in the interim memory MLATCH11.

FIG. 2 helps to explain the main control with microcommands MB and the partial control as far as hardware is concerned, with the data handling unit DHU. The microcommands MB are formed of four main fields:

A sequence control SC14 which is in charge of keeping the sequence link ready;

a data/special control DSC16, which is a field that contains, among other things, an address DREG of the ADMA register PR to be written/read, as well as information concerning the action to be executed (read/RD, write/WR) and the quantity to be transferred (word or byte/WORD). In the case of so-called internal commands (RD=0 and WR=0), these commands do not carry out an external bus cycle but perform internal admistrative tasks. In the case of such internal commands, the DREG field contains control information;

an address control AC7, which contains an address AREG17a of the pointer register PR2, which in turn contains the external address EA required for the information transfer. The address control AC7 furthermore contains an address AREG27b of the pointer register PR2, into which the modified pointer address is to be rewritten. The address control AC7 also contains a control of the address modification caused by the adder ADD3, in the form of two bits ADMUXCTRL and ADMUXC/O; and a command-type control ITC18, which contains data regarding the type of the command such as, for instance, ORG/DMA or SRC/DST.

The information transfer is carried out by a mixed hardware-firmware control. The main control is taken over by microcommands MB of the DMA type. Parts of the data control such as a statement regarding the amount of data to be transferred (WORD) and information concerning the bytes involved (DARHINV, DARLINV) of a set of data assembly (support) registers DARi5a as well as the "OFFSET" formation for the pointer address modification (±0, 1, 2) and the control of a "swapper" in the bus interface unit BIU1, are carried out by a special hardware device, namely the data processing unit DHU5. The data processing or handling unit DHU5 employs special data registers, namely the above-mentioned data assembly registers DARi5a, for the interim storage of data bytes. In addition, the data processing unit DHU5 also administers some control flipflops such as the data assembly register filling state or the data assembly register pointer which are of importance for the input/output sequence of the data with respect to the data handling unit DHU. Finally, the data handling unit DHU prepares information for a "match" and "verify" unit which performs data comparisons.

By virtue of this mixed control of the information transfer, all of the requirements of the information transfer can be met with only five microprograms with a total of about 15 microcommands MB.

In principle, all of the problems during the information transfer could be solved with a purely microprogrammed control. However, this would entail high costs in view of the large number of combinations of the influence parameters (over 350 combinations are possible). Meeting these diversely different information transfer problems is therefore assigned to a special autonomous hardware device, namely the data handling unit DHU5, which cooperates with the microprogram control in the information transfer. Only in this manner, is it possible to satisfy all of the requirements of the data transfer with about 15 microcommands MB, while the DMA channels are fully interruptible among each other, and without loss of time if one channel is interrupted by another.

After microprogrammed initialization, the data processing unit DHU5 independently controls the optimum working-up assembly or operation of all of the DMA transfer blocks of all four channels, in such a way as to be specific to a channel. The mode of this working or operation is determined by the four control parameter sets which are specific to channels, and deposited in the "SETUP" in the command registers CR13. The data handling unit DHU5 is formed of a hardware control EC5c, OC5b which is supported by registers that are specific to channels for the interim storage of the information, and the four data assembly registers DARi5a. The data assembly registers DARi5a are needed specifically for assembly/disassembly cases, but they are also needed for the interim storage of control information such as information on a byte "OFFSET" in the "translate" case or information on a word "OFFSET" for the execution of a relative jump in the concatenation or linking of commands. Finally, the data assembly registers represent the base for the "match" and "verify" control.

The data handling or processing unit DHU5 executes the following activities for a channel which has just been selected:

determination of the access quantity byte or word in writing or reading on the external bus;

activation of halves of the data assembly register DARi5a, specific to a channel, with respect to write and read operations;

control of internal data buses D5d inclusive of an input and output "swapper" which is contained in the bus interface unit BIU1;

control of the required actions for "compare", "mismatch" and "verify" operations;

administration of the four data assembly registers DARi with respect to the DARi filling state (DARFST), position of the first transferred bytes in a quantity of words (FIRST DARBYTE), occurrence of a grading case or reduction (DARP);

administration of signals specific to the channel, SBHL-TOGGLE and DBHLTOGGLE for the control of DARi input and DARi output; and furnishing an "OFFSET" value DO in the two's -complement which is added to the SRC or DST address pointer after each SCR or DST DMA access, in order to ensure working-off or finishing the information string, block by block.

FIGS. 3a,b and 4a,b are circuit diagrams of a data handling or processing unit DHU according to the invention. The control signals used are first explained below:

SPW (source physical bus width) indicates the physical bus width which must be used for source fetching. SPW=SYSBUS (CCR) for system space accrress (SCRM/IO=1). SPW=RESBUS (CCR) for resident space access (SRCM/IO=0). For an 8-bit bus the polarity of SPW is 0, and for a 16-bit bus the polarity is 1.

DPW (destination physical bus width) indicates the physical bus width which must be used in destination operations. DPW=SYSBUS (CCR) for system space access (DSTM/IO=1). DPW=RESBUS (CCR) for resident space access (DSTM/IO=0). The polarity of SPW is 0 for an 8-bit bus and is 1 for a 16-bit bus.

SWL (source logical bus width) indicates the logical and maximum access quantity on the data source bus. SLW is 0 for access quantity "byte" and is 1 for access quantity "word". SWL is formed from the SRCW/B bit of the channel control register (CCR) of the internal register CR, but is set equal to 0 regardless of SRCW/B if SPW is only 8 bits. The physical bus width SPW limits the logical bus width SLW. The indication SRCW/B implicitly gives a data type as well, and thereby a width-dependent interpretation of the address is given. SLW=0 if the address is a byte address. SLW=1 if the address is a word address where "Address" points to the low-significance byte of the word; the more-significant byte of this word is always addressed by the incremented address of the low-significance byte. This also applies to working-up strings in the backward direction (autodecrement).

DLW (destination logical bus width) indicates the logical and maximum access quantity on the data sink bus. DLW=0 for a maximum access quantity "byte" and DLW=1 for a maximum access quantity "word". DLW is formed from the DSTW/B bit of the channel control register CCR, but is set to 0 regardless of DSTW/B, if the physical bus width to the data sink (DPW) is only 8 bits. The physical bus width DPW limits the logical bus width DLW.

SEW (source effective bus width) and DEW (destination effective bus width), respectively, indicate the effective access quantity on the corresponding information bus. SEW and DEW=0 respectively mean access quantity "byte" and SEW and DEW=1 respectively mean access quantity "word". SEW is normally determined from the minimum of SPW and SLW. In three special cases, SEW is fixed at 0, for instance, in the case TRANSLATE (TRA=1), in the case BYTE MUX MODE (BMM=1), and in the case of preparing the last byte of a string, i.e. if BYTECOUNT=1 (BC=1).

DEW is normally determined from the minimum of DPW and DLW. In two special cases, DEW is fixed at 0: In the BYTE MUX MODE case (BMM=1) and in the case of preparing the last byte of a string, i.e., if BYTECOUNT=1 (BC=1).

SED (source effective direction) and DED (destination effective direction), respectively, give the effective source and destination string working-up direction of the DMA block. DED depends on the command bits SRCINC, SRCDEC, DSTINC, DSTDEC of the channel control register (CCR), where the following relationship exists between the source and destination pointer modifications and SED and DED, respectively:

As long as the source pointer modification indicates incrementing or decrementing, SED also indicates incrementing (SED=1) or decrementing (SED=0), independently of the destination pointer modification which is represented by the signals DSTINC and DSTDEC. Only if the source pointer modification indicates no charge, does SED indicate incrementing or decrementing as soon as the destination pointer modification indicates incrementing or decrementing. If the source pointer modification as well as the destination pointer modification indicate no change, SED indicates an incrementation.

DED indicates in incrementation (DED=1) or decrementation (DED=0) independently of the source pointer modification, as soon as the destination pointer modification indicates incrementation or decrementation. If the destination pointer modification indicates no change, then DED indicates an incrementation or decrementation as soon as the source pointer modification indicates an incrementation or decrementation. If neither the destination pointer modification nor the source pointer modification indicates a change, DED indicates an incrementation.

The signals SRCADLSB and DSTADLSB correspond to the least significant bit of the source data pointer register (SPR) and the destination data point register (DPR), respectively. The selection of the relevant bus half in byte transfers with bus configurations of 16 bits is controlled by the two signals just mentioned since in this case, the bus transfer can be transacted alternatively on both bus halves. With 8-bit bus configurations, the transfer always takes place on the less significant bus half, independent of the two signals SRCADLSB and DSTADLSB just mentioned above. If one of these two signals just mentioned is set, the more significant bus half of the respective corresponding bus is selected with a logical bus width of 8 bits, or, in a first bus cycle, the more significant bus half is selected, and in a second bus cycle the less significant bus half is selected, for a logical bus width of 16 bits.

DARFST (data assembly register filling level): The DAR filling level gives the number of bytes stored for an interim period (assembled) in the data assembly register DARi 5a. The DAR register filling level is modified by the source PLA cycle as well as by the destination PLA cycle, and is controlled by the PLA INSTRUCTION REGISTERs specific to a channel. The source cycle increases the filling level by 2 in reading-out a word and by 1 in reading-out a byte, and the destination cycle lowers the filling level by 2 for word operations and by 1 for byte operations. For simplification, the filling level has been provided by means of a 1-bit TOGGLE which remains unchanged in source as well as in destination cycles for word quantities, but inverts its value in case of a byte quantity. The DARFST is reset for each entry into the DATA TRANSFER BLOCK.

DARFSTIN: DARFST signal at the start of a source or destination cycle.

DARFSTOUT: DARFST signal after the execution of a source or destination cycle, respectively.

FIRSTDARBYTE: Characterizes the location of the byte written as the first one into the DATA ASSEMBLY REGISTER (DARi 5a) in "collecting" 2 bytes for forming a word, or characterizes the location of the byte in the DARi if only a single byte is entered in byte-wise SRC/DST transfer cases. The just mentioned signal is only changed in the source cycle. The byte just discussed, points to the low-significance byte if either SEW=16 bits or SEW=8 bits, and SED indicates an incrementation at the same time. FIRSTDARBYTE points to the more significant byte if SEW=8 bits and SED indicates a decrementation. The polarity of the FIRSTDARBYTE is 0 if the low-significance byte is to be flagged. If a word is to be formed in the register DARi 5a by collecting two bytes with two bus cycles, the signal FIRSTDARBYTE is secured in the register DARi 5a by entering the first byte of this word and remains stored up to a new entry of a first byte of a further word into the register DARi 5a. The information FIRSTDARBYTE is required for the output control from the register DARi 5a in a destination cycle. After each entry into a DATA TRANSFER BLOCK, FIRST DAR BYTE is reset. FIRST DAR BYTE IN is the FIRST DAR BYTE signal before a source cycle is executed. FIRST DAR BYTE OUT is the FIRST DAR BYTE signal after a source cycle is executed.

ALIGN: This signal is required for signaling the recognition of a straightening case or reduction. An address straightening case or reduction is involved if, for optimizing the DMA transfer rate for given configurations of SRC/DST bus widths, SRCADLSB, DSTADLSB, SRC or DST counting directions, a byte is transferred (from SRC to DST), so that then all further transfers, at least on one side (SRC or DST) can take place word-wise and therefore considerably faster. Address-straightening or reduction takes place in the following cases:

SEW=16 bits, SRCADLSB=1, SED=increment, DEW=16 bits, DSTADLSB=1, DED=increment: SRC and DST can be straightened. The transfer takes place after the address straightening word-for-word on the SRG as well as on the DST side.

SEW=16 bits, SRCADLSB=1, SED=increment, DEW=8 bits, DSTADLSB has no influence, DED is either equal to "increment" or equal to "no modify": SRC can be straightened. The transfer takes place word-for-word after the address straightening on the SRC side.

On the DST side, working-ip or operating is continued byte-wise as before.

SEW=8 bits, SRCADLSB is without influence, SED is either equal to increment or equal to "no modify", DEW=16 bits, DSTADLSB=1, DED=increment: DST can be straightened. After straightening, the transfer takes place word-wise on the DST-side. On the SRC side, the microinstruction is formed byte-wise as before.

All of these cases lead to the activation of the signal ALIGN, which initiates the grading, and in which first of all only one byte is transferred from SRC to DST.

DARP (DATA ASSEMBLY REGISTER POINTER): This signal is required as a flag for the grading case, since the recognition signal for the grading case (ALIGN) disappears after the first byte is transferred. The signal DARP is set when the first SCR byte is fetched for grading and remains unchanged during all of the following byte/word transfer processes. When it it set, the DARP signal modifies the entry of the data into the DATA ASSEMBLY REGISTER, taking the signal DARFSTIN into consideration, it signals to the destination cycle the type of entry of a word in the register DARi and it therefore partially takes over the task of the FIRST DAR BYTE. The DARP signal is reset with each entry into a new DATA TRANSFER BLOCK.

The following relationship applies to the entry control into the register DARi if the signed DARP is set=1:

If the transfer quantity (WORD PLA)=16 bits and if DARFSTIN=0, the low significance byte is entered after DARH and the higher-significance byte is entered after DARL. If the transfer quantity =8 bits and DARFSTIN=0 the byte is entered after DARL.

DARPIN is the signal DARP at the input of SRC or PLA or DST-PLA.

DARPOUT is the signal DARP at the output of the SRC-PLA.

SBHLTOGGLE (source byte high/low toggle) is required for the entry control of the register DARi in the SRC cycle as well as for the release of the "match" state for word matches. This signal changes its state for each SRC cycle, with which a single byte was retrieved.

This signal thus remains unchanged in word-wise SRC cycles and in all DST cycles. If this signal is set, it modifies the entry of a byte to be retrieved into the register DARi, taking into consideration further parameters such as input filling level (DARFSTIN) and DARP. If this signal is set at the start of a cycle, the match flag formed after the retrieval of the second byte for the normal byte match, is used for forming a word match (if enabled). This signal is reset with every entry into a new DATA TRANSFER BLOCK.

DBHLTOGGIE (destination byte high/low toggle); This signal is required for the output control of the register DARi in the DST cycle, and in this case modifies the readingout of bytes from the register DARi, taking further parameters such as the input filling level (DARFSTIN) and the signal DARP into consideration. This signal changes its state with every byte-wise writing in a DST cycle. This signal therefore remains unchanged during word-wise writing in the DST cycle and in all SRC cycles. This signal is reset with every entry into a new DATA TRANSFER BLOCK.

XFERSWAP (DMA TRANSFER SWAP): This signal serves to control the communication between the register DARi (through the internal bus D) and the external bus in the case of DMA transfer cycles. In the case of a set signal DMAWRITE, the signal XFERSWAP is used directly for controlling a DATA OUTPUT SWAPPER at the external bus interface unit BIU which connects the internal data bus D to the external data bus, so as to be mirrored byte-wise. In case of a signal DMAREAD, the signal XFERSWAP is delayed in a pipeline chain (PIP1, PIP3), so that upon the arrival of the read data through a DATA INPUT SWAPPER at the bus interface unit BIU, the possibility of reading-in the external data bus on the internal data bus D, so as to be mirrored byte-wise, is assured. The polarity of the signal XFERSWAP is 0 if the bus halves are not to be mirrored.

BYTEMUXMODE (8-bit multiplex mode): This signal is set if channel 3 is configured as a byte-multiplex channel, and if the effective bus width (SEW or DEW) is 8 bits.

DARHINV (DAR BYTE HIGH INVOLVED) and DARLINV (DAR BYTE LOW INVOLVED): Information on the parts of the register DARi used in a DMA source or DMA destination cycle. Whether the DARi register parts are written-on or read during DMA cycles, depends on the corresponding microcommand bit (RD, WR, ORG, DARWE, SRC) as well as on machine-internal blocking signals such as SPLIT1, SPLIT2 and a time condition for reading and writing with respect to the register DARi.

WORDPLASRC: Output signal from the data handling or processing unit DHU takes the access quantity (word or byte) to the external bus in the case of an SRC cycle. An SRC word access request is present if the effective SRC bus width is 16 bits and no ALIGN case is ascertained.

WORDPLADST: Output signal from the data-processing unit DHU gives the access quantity (word or byte) on the external bus in the case of a DST cycle. A DST word access request is present if the effective destination bus width DEW=16 bits and the DAR filling level is equal to 2 bits (DARFSTIN=0).

WORDPLA: This output signal indicates the desired access quantity (byte or word) as a control signal to the bus interface unit BIU. This signal is composed of WORDPLASRC in the case of a source cycle.

DMA OFFSET 2 . . . 0: These output signals are required during DMA-SCR and during DMA-DST cycles, for modifying the SRC data pointer or DST data pointer just being used, since these pointers can be incremented or decremented automatically after a DMA cycle by the access quantity (byte/word). These signals are determined in a two's complement and fed directly to the adder ADD, where a "SIGN EXTENSION" to 24 bits is performed. Then, the following OFFSETs OF are possible:

+2: Increment for word quantity,
+1: Increment for byte quantity or word quantity with end treatment,
0: No change for word/byte quantity,
−1: Decrement for byte quantity, −2: Decrement for word quantity.

The generation of the DMA OFFSETs is controlled by the INC/DEC bits of the channel control register CCR as a function of the access quantity (WORDPLA) and the byte count (BC=3) for the end treatment.

SRCPLAIR 3 ... 0 CP, DSTPLAIR 3 ... 0 CP (PLA INSTRUCTION REGISTER CLOCKS): The four registers PLAIR 3 ... 0 image the status of the four DMA channels at any instant. These registers are instruction registers for the PLA as well as result registers after the respective PLA have run through. Since at a given instant only one DMA channel released by the priority logic PRIOi can claim the flow control AS and the wording-off units of the ADMA for itself, the set of parameters specific to a channel (multiplexed by four channels) is also switched in the data processing unit DHU to the SRC and DST-PLA. After the SRC and the DST-PLA run-through, the outputs of the respective PLA are rewritten into the registers PLAIRi which are specific to a channel, in dependence on the microword (SRC bit, ORG bit), in dependence on internal enable signals such as STATUS ENABLE and BIUSPLIT-Q Since the parameter DBHLTOGGLE is not to be changed in the SRC-PLA run-through, the register PLAIRi only takes over the parameters FIRST DAR BYTE, DARFST, DARP and SBHLTOGGLE when the SRCPLAIRCP is activated. If the DSTPLAIRCP is activated, only the parameters DBHLTOGGLE and DARFST are taken over into the register PLAIRi.

PLAIR 3 ... 0 RES (PLA INSTRUCTION REGISTER RESET): These four signals cause the RESET for its PLA INSTRUCTION REGISTER PLAIRi, when a specific DATA channel enters into a new DATA TRANSFER BLOCK. In this operation, the following signals are set to a logical 0: DBHLTOGGLE, FIRST DAR BYTE, DARFST, DARP, SBHLTOGGLE. Under microprogram control, the resetting is performed with a certain coding in the MAPCTR field of the microcommand MB, namely, of the condition TRANSFER MAPEN.

WECCR 3 ... 0: These write clocks of the channel control registers CCR are activated during "SETUP" if the channel command has been written independently into the channel control register CCR by the ADMA command block.

WIDBUS 00-Q ... 07-Q: These signals belong to a local data bus for writing the parameters contained in the channel control register CCR into the static PLA parameter flip-flops.

Figure 3B:
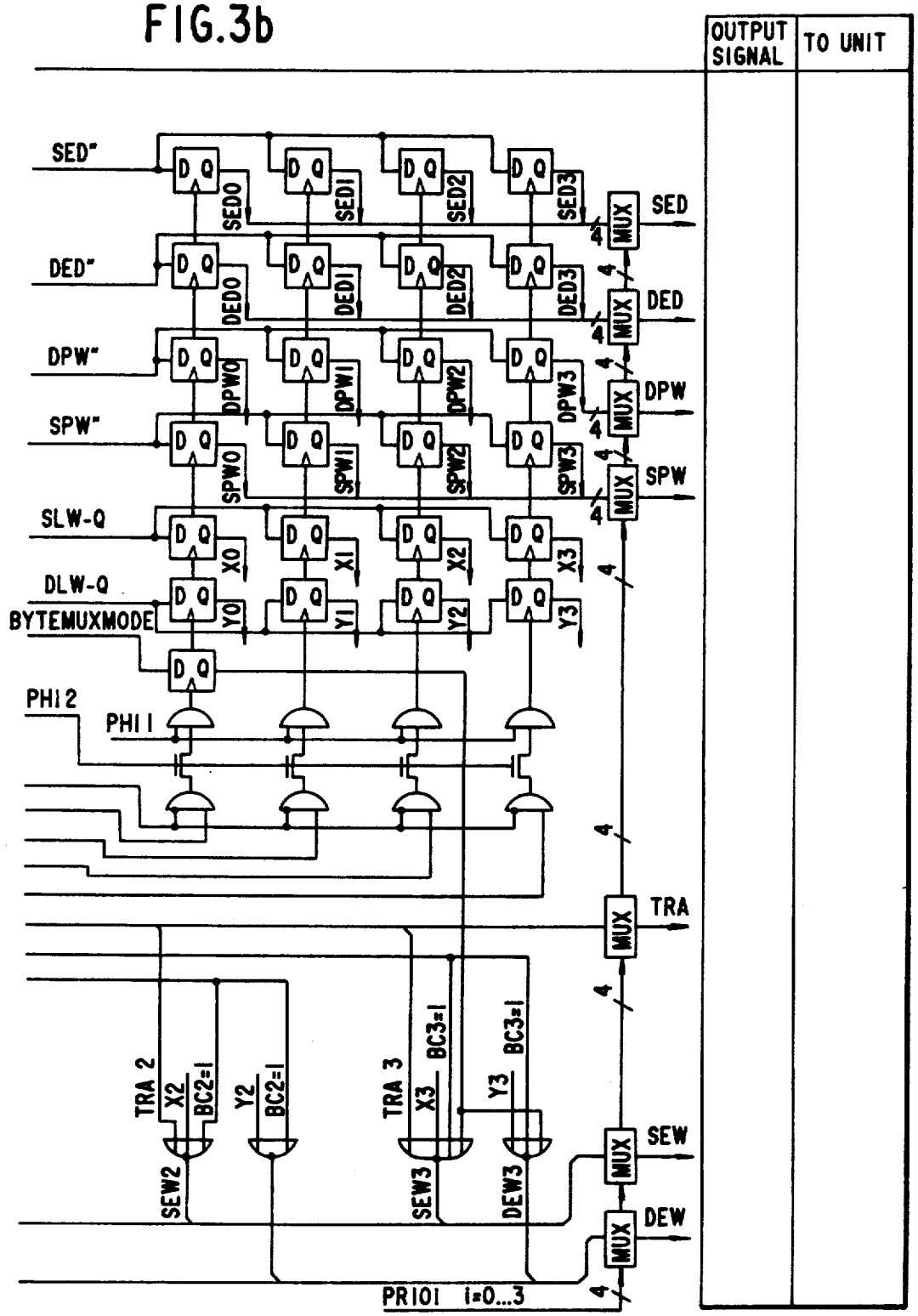
FIGS. 3a, 3a', 3a", 3b, 4a, 4a, 4a', 4a" and schematic circuit diagrams of a data processing or handling unit according to the invention.
Figure 4B:
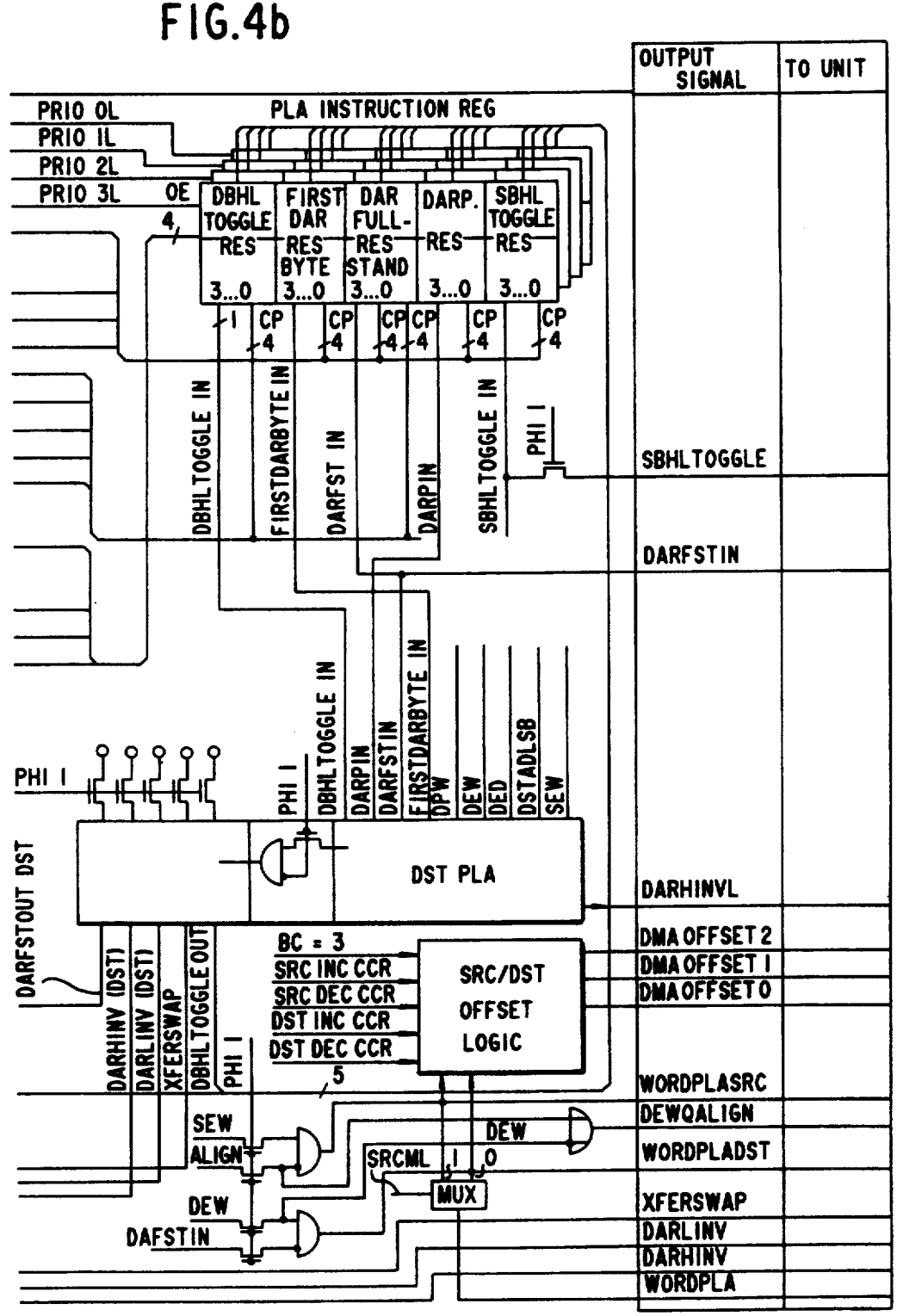

As mentioned above, FIGS. 3 and 4 show the circuit diagram of a data handling or processing unit DHU according to the invention. FIG. 3 is divided into two parts, FIG. 3a and FIG. 3b. If FIG. 3b is placed flush and to the right of FIG. 3a, the complete FIG. 3 is seen. If FIG. 4b is placed to the right of FIG. 4a, the complete FIG. 4 is seen. FIGS. 3 and 4 are self-explanatory, together with the explanations for the signals given above and together with the truth tables for these signals given in FIGS. 5 and 6. A PLA (programmable logic array) can be constructed for preset input signals and preset output signals of these PLAs, in a simple manner by anyone who has become familiar with the textbook by C. MEAD and L. Conway, entitled "Introduction to VLSI Systems", published by Addison-Wesley, especially Chapter 3.10 "The Programmable Logic Array".

FIG. 5 is a truth table for the SRC PLA. More specifically, in the left half, the input parameters are arranged from left to right: SPW, SEW, SRCADLSB, SED, DARFSTIN, DARPIN, SBHLTOGGLEIN, ALIGN. The output parameters of the SRCPLA are given in the right half of FIG. 5 and more specifically in the following order from left to right: WORDPLASRC, DARHINV, DARLINV, XFERSWAP, DARFSTOUT, DARPOUT, FIRSTDARBYTE, SBLHTOGGLEOUT.

FIG. 6 is a thruth table for the DSTPLA. The input parameters for DSTPLA are given in the left half of FIG. 6, and specifically in the same order from the left to right: DBHLTOGGLEIN, DARPIN, DARFSTIN, FIRSTDARRYTE, DPW, DEW, DED, DSTAPLSB, SEW. In the right half of FIG. 6, the output parameters for DSTPLA are given in the specific order of the columns from left to right as follows: WORDPLADST, DARHINV, DARLINV, XFERSWAP, DBHLTOGGLEOUT, DARFSTOUT.

In FIGS. 5 and 6, a 1 corresponds to the logical 1 of the parameter contained in the respective column, a 0 corresponds to the logical 0 of the parameter contained in the respective column, and an x means that the polarity of the respective input parameter in the corresponding row does not matter for the output parameter configuration of the corresponding row.

FIG. 2 shows the 38 bits in MLATCH which come from the microcommand MB and from the prioritizing unit PRIO. FIG. 2 also shows a block diagram for a DMA control DC of the data handling or processing unit DHU. The control DC is given nine statistical parameters by the channel control registers CCR through the PLA registers PLAIRI. Five parameters are dynamically coupled in a "feedback" circuit onto the respective SRC-DST PLA. In addition, the control DC provides three bits for the DMA-OFFSET OF. The five dynamic parameter bits for FEEDBACK contribute to the pipeline execution control P1P1.

We claim:

1. Circuit arrangement in a direct memory access controller having a plurality of independent data transmission channels for autonomous data transmission between a plurality of data sources and data sinks, the circuit arrangement comprising a microprogram, a microprogram memory for storing said microprogram, a plurality of microprogram instruction registers, one for each of said data transmission channels, having inputs connected to said microprogram memory, each microprogram instruction register operating to store a respective channel-specific microprogram instruction, and each microprogram instruction register receiving said respective microprogram instruction from said microprogram memory, a microprogram interim memory having an input connected to said microprogram instruction registers for receiving a respective microprogram instruction from one of said microprogram instruction registers for a current data transmission, controlling means having inputs connected to said microprogram interim memory for controlling said current data transmission, said controlling means being connected to said microprogram interim memory and being responsive to said respective microprogram instruction for execution of said microprogram instruction, an independently operating data handling unit for determining presence of an access byte/word during data transmission having an input connected to said controlling means, a data assembly register having an input connected to said data handling unit, and respective outputs assigned to each of said data transmission channels for temporary storage of data bits or control information, means in said data handling unit for, after microprogrammed initialization, executing channel-specific processing of the data transmission.

2. Circuit arrangement according to claim 1, wherein said data handling unit further comprises an off-set controller and an execution controller, connected to said data assembly register, for exchanging information with said data sinks and said data sources.

3. Circuit arrangement according to claim 1, including at least one control flip-flop connected to said data handling unit for controlling entry and exit sequence of data in said data handling unit.

4. Circuit arrangement according to claim 1, wherein said handling unit further comprises a match-verify unit for executing data comparisons.

5. Method for operating a circuit arrangement in a direct memory access controller having a plurality of independent data transmission channels for autonomous data transmission between a plurality of data sources and data sinks, a microprogram, comprising channel-specific microprogram instructions, stored in a microprogram memory, a plurality of microprogram instruction registers, one for each of said data transmission channels, having inputs connected to said microprogram memory, each of said microprogram instruction registers storing a respective channel-specific microprogram instruction, a microprogram interim memory having an input connected to said microprogram instruction registers, controlling means for controlling transmission of data having inputs connected to said microprogram interim memory and being responsive to said channel-specific microprogram instructions, an independently operating data handling unit having an input connected to said controlling means, a data assembly register having an input connected to said data handling unit and respective outputs assigned to each of said data transmission channels for temporary storage of data bits on control information, means in said data handling unit for, after microprogrammed initialization, executing channel-specific processing of the data transmission, the method comprises the steps of:

(a) executing, by said controlling means, a channel-specific microprogram instruction from one of said plurality of microprogram instruction registers; said data handling unit receiving said channel-specific microprogram instruction from said controlling means;

(b) executing, after microprogram initialization of said data handling unit, channel-specific transmission of data in a respective data transmission channel; and (c) determining, independently by said data handling unit, presence of an access byte-word during an information transfer to one of said data transmission channels.

6. Method according to claim 5, wherein said data assembly register has two halves, further comprising the step of activating the data assembly register halves with the data handling unit for transfer of data.

7. Method according to claim 6, including a bus interface unit connected to said data transmission channels and a swapper in the bus interface unit, and internal data buses connected to the data assembly register and the bus interface unit, further comprising the step of controlling said internal data buses with said data handling unit.

8. Method according to claim 6, further comprising the step of controlling with said data handling unit, operations for comparing, mismatching, and/or verifying data.

9. Method according to claim 6, including control parameters DARFST, FIRST, DARBYTE, and DARPE in said data assembly register, further comprising the step of managing said control parameters with said data handling unit.

10. Method according to claim 6, including an offset value in said data handling unit, an address pointer registers for storing an address pointer, and an adder connected to said address pointer and said register and said, further comprising the step of adding said offset value to said address pointer via said adder each direct memory access operation.

* * * * *